(12) United States Patent
Nunn

(10) Patent No.: US 9,282,724 B2
(45) Date of Patent: Mar. 15, 2016

(54) PET TOY WITH NOISE MAKING DEVICE ACTIVATED BY EXPANSION AND CONTRACTION OF TOY

(71) Applicant: The KONG Company, LLC, Golden, CO (US)

(72) Inventor: Hoyt Samuel Nunn, Irvine, CA (US)

(73) Assignee: The KONG Company, LLC, Golden, CO (US)

( * ) Notice: Subject to any disclaimer, the term of this patent is extended or adjusted under 35 U.S.C. 154(b) by 149 days.

(21) Appl. No.: 14/249,992

(22) Filed: Apr. 10, 2014

(65) Prior Publication Data

US 2015/0289482 A1    Oct. 15, 2015

(51) Int. Cl.
*A01K 15/02* (2006.01)
*A01K 29/00* (2006.01)
*A63H 3/06* (2006.01)

(52) U.S. Cl.
CPC .................................... *A01K 15/025* (2013.01)

(58) Field of Classification Search
CPC ............. A63H 5/00; A63H 3/28; A63H 3/06; A01K 15/026; A01K 15/025
USPC .................. 119/709, 707, 702, 708, 710, 711; 446/183, 184, 409, 397, 188
See application file for complete search history.

(56) References Cited

U.S. PATENT DOCUMENTS

| | | | | |
|---|---|---|---|---|
| 4,304,063 A * | 12/1981 | Katzman | ................... | A63H 3/48 446/183 |
| 5,846,116 A * | 12/1998 | DiResta | ................... | A63H 3/00 446/184 |
| 5,895,308 A * | 4/1999 | Spector | ................... | A63H 5/00 446/183 |
| 6,109,998 A * | 8/2000 | DiResta | ................... | A63H 3/00 446/184 |
| 6,112,703 A * | 9/2000 | Handelsman | ........ | A01K 15/026 119/707 |
| 6,672,932 B1 * | 1/2004 | Panec | ....................... | A63H 3/02 446/183 |
| 6,892,674 B1 | 5/2005 | Dubinins et al. | | |
| 7,833,079 B2 | 11/2010 | Willinger et al. | | |
| 8,262,430 B2 * | 9/2012 | Ivanic | ....................... | A63H 3/06 446/220 |
| 8,312,844 B2 | 11/2012 | Mann | | |
| 8,342,132 B2 | 1/2013 | Markham | | |
| 8,418,656 B2 | 4/2013 | Rutherford et al. | | |
| 8,468,977 B2 | 6/2013 | Markham | | |
| 8,573,159 B1 * | 11/2013 | Crotty | ................... | A01K 15/025 119/707 |
| 8,881,685 B2 * | 11/2014 | Miavitz | ................ | A01K 15/025 119/707 |
| 2005/0042972 A1 * | 2/2005 | Mann | ................... | A01K 15/026 446/183 |
| 2012/0012067 A1 | 1/2012 | Stout et al. | | |

* cited by examiner

*Primary Examiner* — Yvonne Abbott-Lewis
(74) *Attorney, Agent, or Firm* — Sheridan Ross P.C.

(57) ABSTRACT

The invention is a pet toy with a noise making device secured therein and activated by at least one of a compression force, tension force, or combinations thereof applied to the pet toy. A preferred embodiment includes a flexible and resilient body with a noisemaking device disposed within the body and mounted to an elastic base secured to an interior surface of the body. The device includes a flexible or elastomeric bladder with a noisemaking element mounted within the bladder. Deformation of the bladder by applied forces allows air to pass through the noisemaking device, thereby producing sound. The invention also includes a method of activating a noise making device of the pet toy by a selected one, or a combination of forces applied to the toy.

18 Claims, 3 Drawing Sheets

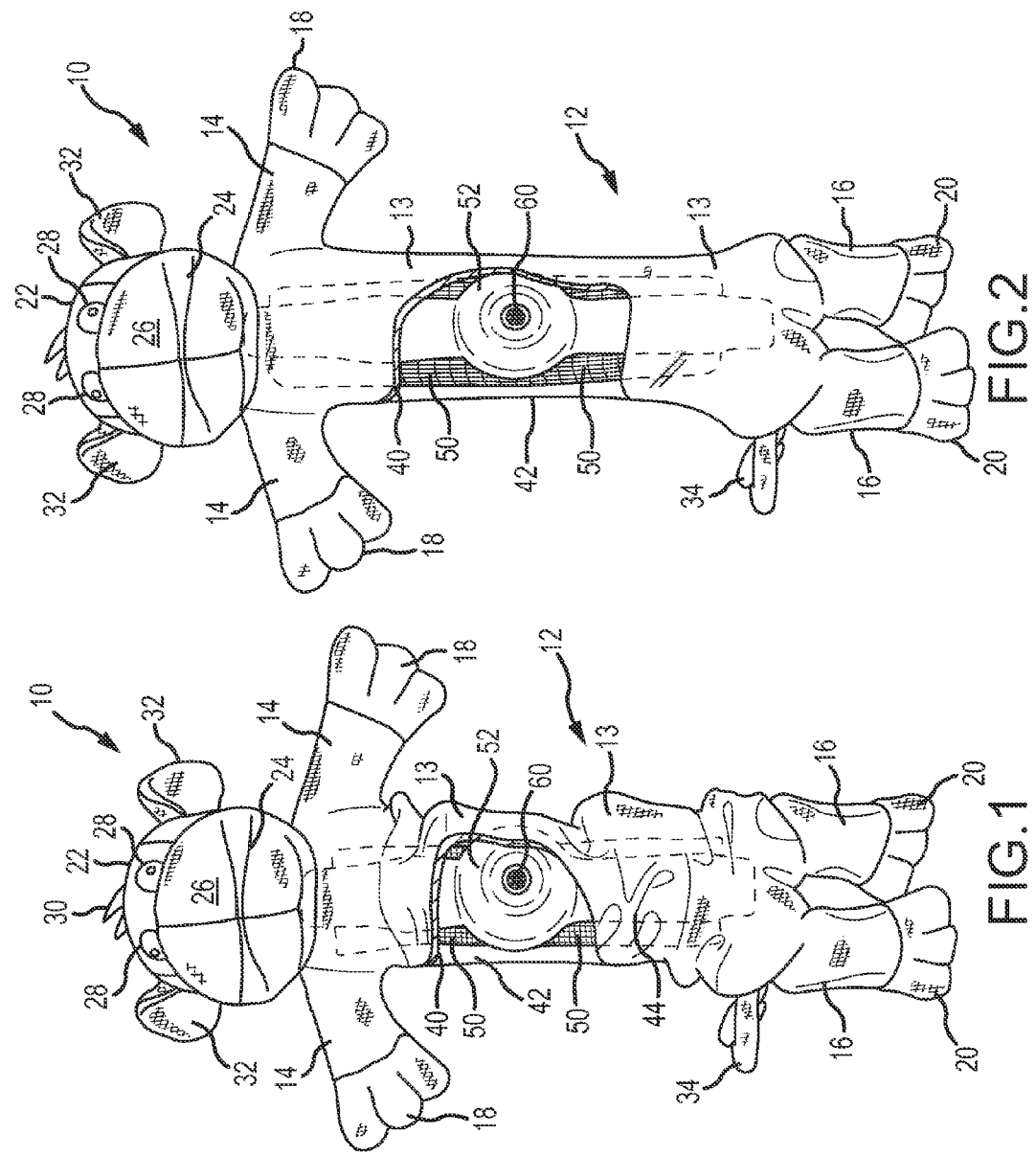

PET TOY WITH NOISE MAKING DEVICE ACTIVATED BY EXPANSION AND CONTRACTION OF TOY

FIELD OF THE INVENTION

The invention relates to pet toys, and more particularly, to a pet toy incorporating a noise making device that is activated by changing the shape or configuration of the toy, and more particularly, to a pet toy in which activation of the noise making device is achieved by a controlled expansion or stretching of the pet toy, as well as contraction or shrinking of the pet toy back to its normal or unexpanded state.

BACKGROUND OF THE INVENTION

Pet toys have been developed to provide increased functionality, with one intention for the pet toys to provide improved and extended interaction for animals. It is known that extending the duration and intensity of interaction between an animal and a pet toy can provide benefits for the animal. For dogs that may experience certain behavioral problems, such as separation anxiety, providing a toy that can keep the dogs occupied for a longer period of time can be therapeutic thereby reducing destructive behaviors that occur from the anxiety. Toys that can be chewed over long periods may provide improved mastication for animals, as well as dental cleaning.

One feature used in many pet toys is the provision of a noise making device, commonly referred to as a "squeaker". As an animal bites upon the pet toy and makes contact with an overlying portion of the pet toy housing the squeaker, the squeaker is activated to produce a sound. Although squeakers can potentially improve the interaction between the animal and the toy, one drawback associated with squeakers is that they may become easily damaged and destroyed by the animal over a short period of time. Some inventions are directed to providing better protection for a squeaker used in a pet toy.

Another drawback associated with squeakers used in pet toys is that activation of the squeaker may require force to be applied to the pet toy at a specific location and direction otherwise; the squeaker will not be activated. Accordingly, the squeaker may not be activated enough for the animal to remain interested in the toy. Conversely, another drawback associated with squeakers used in pet toys is that if the squeaker is used with a pet toy such as an elastic ball, the squeaker becomes activated upon nearly each type of force applied to the pet toy, and the squeaking noise may over stimulate the animal or annoy the animal as well as annoy the pet owner.

References that disclose various forms of pet toys that incorporate squeakers include U.S. Pat. Nos. 8,342,132; 8,312,844; 8,468,977; 8,418,656; and 7,833,079. These references and others disclose numerous different types of noise making devices used within pet toys. The pet toys may be made of an elastomeric material such as rubber or plastic, or the noisemaking devices may be housed within fabric or cloth pet toys, often referred to as "plush" toys.

Although these references may be adequate for their intended purposes, there is still a need to provide a noisemaking device within a pet toy that can be activated by a number of different types of forces applied to the pet toy. In this way, activation of the noisemaking device may be less predictable, but provide greater interaction since the animal will not automatically associate a biting action with automatic activation of the noisemaking device. There is also a need to provide a pet toy that provides not only interaction for the animal, but also interaction for the pet owner in which the pet owner and animal may interact simultaneously with the pet toy to provide amusement for both the animal and the pet owner.

SUMMARY OF THE INVENTION

The invention includes a pet toy with a noise making device or feature that is activated by application of different types or modes of force applied to the pet toy. More particularly, the invention includes a pet toy in which the noisemaking device can be activated not only by application of direct force to the noisemaking device, but also indirect forces applied to the noisemaking device in which such forces can be applied to portions of the pet toy not directly connected to the squeaking device.

According to one preferred embodiment of the pet toy, it includes a body made of a flexible and resilient material, such as fabric, in which a noisemaking device is disposed within the body and mounted to an elastic base that is secured to an interior surface of the body. The elastic base may include a section of elastic fabric webbing that is secured to the interior surface of the body. The noisemaking device includes a flexible or elastomeric bladder with a noise making element mounted within the bladder. The noisemaking device can be activated in the traditional manner by depressing the body of the pet toy at the location where the noisemaking device is mounted. The noisemaking device can also be activated by stretching or elongating the pet toy which in turn, causes elongation of the bladder to activate the noisemaking element. More specifically, when the bladder is elongated, the hollow space or chamber within the bladder reduces in volume causing air to pass through the noise making element, resulting in the production of sound.

In one aspect of this preferred embodiment, the elastic base is mounted within the body of the pet toy and is secured at substantially opposite ends thereof. The elastomeric bladder has an elongated shape, and extends along a selected length of the elastic base. Portions of the body extend beyond the dimensions of the elastic base. When the body of the pet toy is stretched to elongate the pet toy, the pulling or stretching force is transferred to the elastic base and therefore also to the elastomeric bladder mounted to the elastic base. The deformation of the elastomeric bladder results in activation of the noisemaking element as described. When force is released, the elastic base retracts to its normal unexpanded state. Depending upon the configuration of the noise making device, the retraction of the elastic base allowing corresponding retraction of the bladder can also result in a noise produced as air re-enters the bladder.

The noisemaking element can be a traditional squeaker that is characterized by a small tubular section of material with a flexible reed disposed within the tube. Flow of air through the tube, in either direction through the tube, may result in vibration of the reed which results in the production of sound.

The invention also includes a method of activating a noise making device of the pet toy. According to this method, activation of the noisemaking device can be achieved by at least one force selected from a plurality of forces. These forces include a compression force applied to the noisemaking device, a tension or stretching force applied to the noisemaking device, or combinations thereof. To accommodate the method, the pet toy includes the stretchable or elastomeric bladder that houses the noisemaking element. Deformation of the elastomeric bladder causes a flow of air to pass through the noisemaking element to produce sound. This deformation can occur by a compression force applied to the noisemaking device, or by stretching of the bladder which also results in the flow of air to pass through the noisemaking element.

A preferred embodiment of the pet toy may incorporate a body having external features resembling an object or animal. For example, according to a preferred embodiment of the invention, the shape of the pet toy may represent a desired animal, and exterior features of the body may be shaped to represent features of the animal.

Considering the above features of the invention, in one aspect, it may be considered a pet toy comprising: (i) a flexible body having an interior defining an open space therein; (ii) an elastic base extending along a portion of said flexible body; (iii) an elastomeric bladder secured to said elastic base, said elastomeric bladder defining a chamber therein, and at least one opening formed in said elastomeric bladder enabling air to flow through said bladder; (iv) a noisemaking element disposed within said elastomeric bladder; and wherein a force applied to said flexible body to deform said bladder enables air to flow through said bladder, thereby activating said noisemaking element to produce a sound.

In connection with this first aspect of the invention, other related aspects of the invention include a pet toy wherein: (i) said elastomeric bladder has an elongated shape defined by a dome, a first extension extending from one side of said dome, and a second extension extending from an opposite side of said dome, and said chamber extending within said dome and selected portions of said first and second extensions; (ii) said flexible body has a shape resembling a selected animal; (iii) said flexible body includes a central torso section, and said elastic base and elastomeric bladder being disposed in said central torso section; (iv) said flexible body includes a first appendage located adjacent a first end of said flexible body, and a second appendage located adjacent a second opposite end of said flexible body; (v) said first and second appendages include at least one of an arm and a leg; (vi) said flexible body includes features resembling features of the selected animal, said features including at least one of an arm, a leg, a finger, a toe, a head, a mouth, a nose, an eye, hair, an ear, and a tail; (vii) said elastic base includes a length of elastic fabric webbing; and (viii) said elastomeric bladder includes an interior tubular extension for mounting of said noise making element within said chamber of said bladder (ix) said elastomeric bladder has an elongated shape that extends along a longitudinal axis.

In yet another aspect of the invention, it may be considered a method of activating a noise making device of a pet toy, said method comprising: (a) providing a pet toy including: (i) a flexible body having an interior defining an open space therein; (ii) an elastic base extending along a portion of said flexible body; (iii) an elastomeric bladder secured to said elastic base, said elastomeric bladder defining a chamber therein, and at least one opening formed in said elastomeric bladder enabling air to flow through said bladder; (iv) a noisemaking element disposed within said elastomeric bladder; (b) applying a force to said flexible body to deform said bladder; and (c) causing air to flow through said bladder and thereby activating said noise making element to produce a sound.

In connection with the method of the invention, other aspects of the method include: (i) said step of applying force includes applying force by at least one of a compression force and a tension force; and (ii) said tension force is applied by securing substantially opposite ends of said pet toy and pulling the ends away from one another.

In yet another aspect of the invention, it may considered a pet toy comprising: (i) a body having an interior defining an open space therein; (ii) a base extending along a portion of said body; (iii) a bladder secured to said base, said bladder defining a flexible chamber therein, and at least one opening formed in said bladder enabling air to flow through said bladder; (iv) a noisemaking element disposed within said bladder; and wherein a force applied to said body to deform said bladder enables air to flow through said bladder, thereby activating said noisemaking element to produce a sound.

According to this latter aspect of the invention as a pet toy, other aspects include: (i) said bladder has an elongated shape defined by a dome, a first extension extending from one side of said dome, and a second extension extending from an opposite side of said dome, and said chamber extending within said dome and selected portions of said first and second extensions; (ii) said base includes a length of an elastic piece of material; (iii) said bladder has an elongated shape that extends along a longitudinal axis; and (iv) a tension force applied to said body causes said base and said bladder to stretch thereby changing a shape of the chamber of said bladder, and causing air to flow through a vent in said bladder.

The foregoing features of the invention, along with others, are described in more particular detail, as set forth in the following drawings and detailed description. Other features and advantages of the invention will become apparent also from a review of the following detailed description, taken in conjunction with the drawings.

BRIEF DESCRIPTION OF THE DRAWINGS

FIG. 1 is a fragmentary perspective view of the pet toy of the invention, showing a noisemaking device disposed within a body of the pet toy;

FIG. 2 is another fragmentary perspective view of the pet toy showing the noisemaking device in which a tension force has been applied to stretch or expand the pet toy;

DETAILED DESCRIPTION OF THE INVENTION

Figure 4:
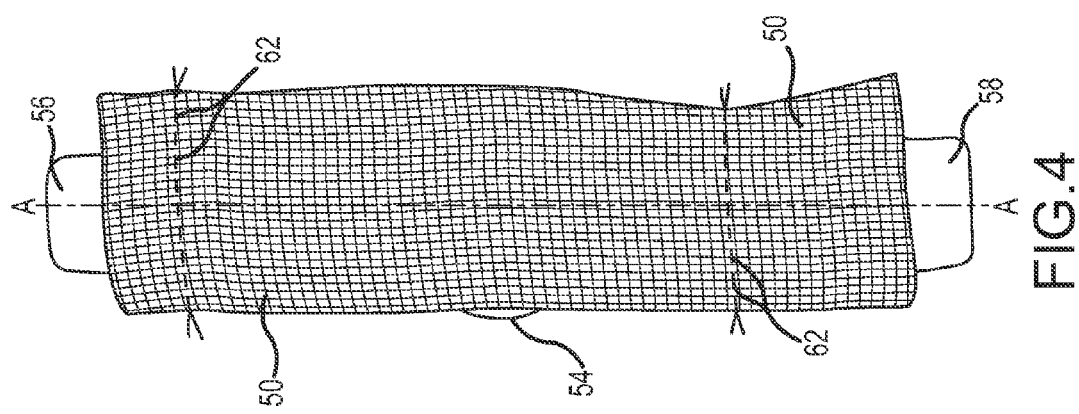
FIG. 4 is an enlarged rear perspective view of the noisemaking device mounted to the elastic base.

Referring to FIG. 1, the pet toy 10 is illustrated in its un-expanded or un-stretched state. The pet toy shown in the illustrated embodiment has a shell or exterior surface made from a flexible, resilient material such as fabric. The body 12 of the pet toy includes a middle or torso section 13 and appendages secured to opposite ends of the torso 13. As shown, the appendages include arms 14 and legs 16. The body also includes a head 22 with additional features shown as a mouth 24, a nose 26, eyes 28, hair 30, and ears 32. Further detail is shown in FIG. 1 to include hands with fingers 18, feet with toes 20 and a tail 32. Accordingly, the pet toy of FIG. 1 represents the shape of an animal, such as a monkey. Although the embodiment of FIG. 1 illustrates a specific animal, it should be understood that the invention is not limited to any particular shape in terms of depicting an animal or object.

Within the torso section 13 of the body 12, a section or length of elastic webbing 50 is shown, which serves as a base or support for a noisemaking device 52 secured to the elastic base 50. The noisemaking device 52 in the preferred embodiment may be more particularly defined as a bladder. The cutaway portion of FIG. 1 more specifically shows the torso section 13 with a front side 40 of the fabric body 12 and a rear side 42 of the fabric body. The elastic base 50 is sewn or otherwise secured to the rear side of the fabric body according to the view from FIG. 1. When the pet toy is residing in its normal or un-stretched state, an excess amount of fabric is provided, shown as groups of excess fabric 44 within the torso section 13 of the body. As also shown, the elastic base 50 and bladder 52 of the noisemaking device extend along a portion of the length of the torso section.

Referring to FIG. 2, this figure illustrates how the pet toy appears when it is stretched. For example, a tension force can be applied to opposite ends of the pet toy in order to stretch or expand the torso section 13. In this regard, a pet owner, an animal, or both (for example in a tugging action between the owner and the pet) grasp opposing ends of the pet toy to stretch the pet toy, resulting in the expansion or elongation of the torso section. As this elongation occurs, the elastic base 50 is stretched, which in turn causes the bladder 52 to elongate or stretch as well.

Figure 3:
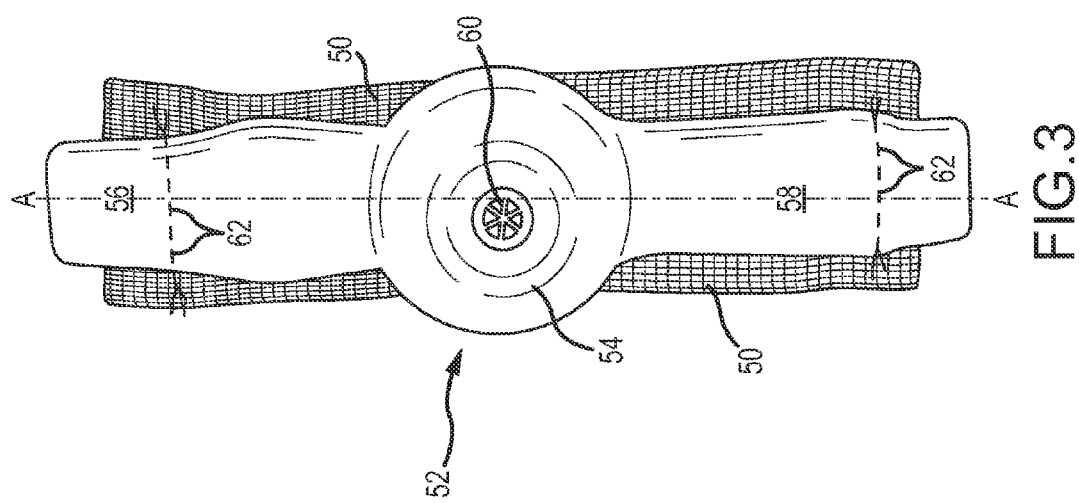
FIG. 3 is an enlarged front perspective view of the noisemaking device mounted to the elastic base.

Referring to FIG. 3, details of the elastic base 50 and bladder 52 are shown. Specifically, the bladder 52 is secured to the elastic base 50, such as by stitching 62. Alternatively, the bladder 52 can be secured to the elastic base 50 as by adhesive. The bladder 52 is characterized by a dome or central portion 54, and two extensions that extend from opposite sides of the dome, shown as first extension 56 and second extension 58. The bladder 52 can therefore be further described as having an elongated shape by inclusion of the oppositely extending extension 56 and 58. The elastic base 50 and bladder 52 can each can be further described as extending substantially along a longitudinal axis A-A, and parallel with one another along this longitudinal axis. Referring to FIG. 1, it is also seen that this combination extends along a general longitudinal axis or length of the pet toy 10. The bladder 52 also includes a vent hole or opening 60 which allows air to enter into and escape from the interior open space or chamber 74 within the bladder 52. As shown, the vent hole is covered with a small grating element to prevent foreign objects from entering the noise making element 70.

Figure 5:
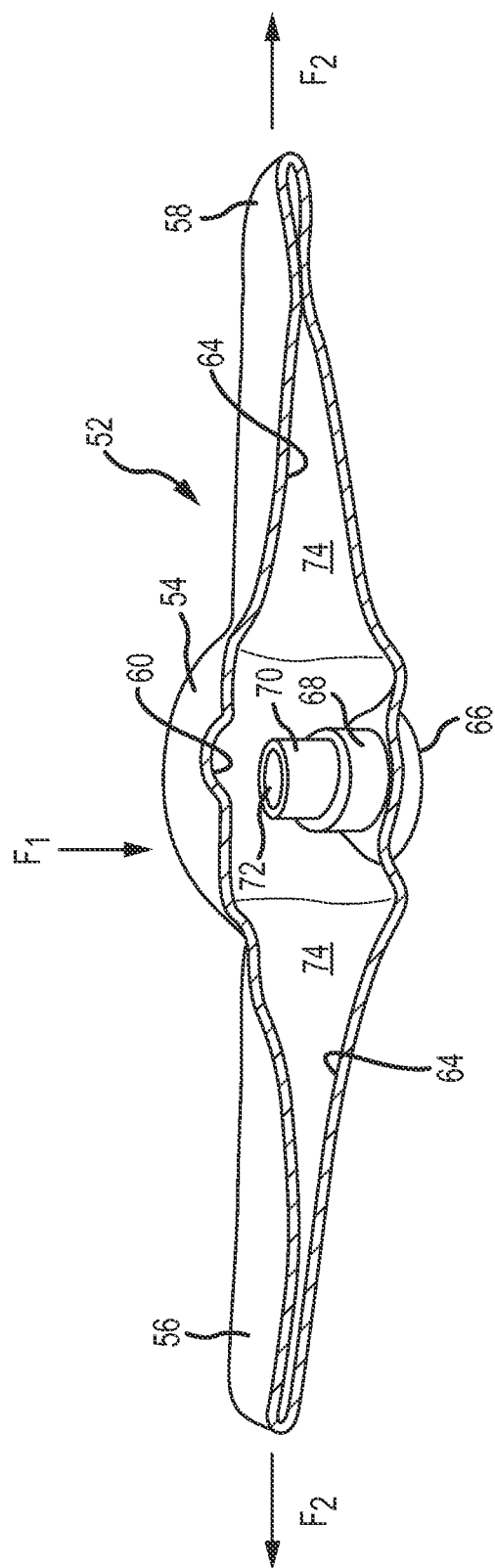
FIG. 5 is a greatly enlarged cross-sectional perspective view of the noisemaking device and a noise making element mounted therein.

Referring to FIG. 5, additional details of the bladder 52 are illustrated. As shown, the bladder includes the dome 54, and opposite extending extensions 56 and 58. A sidewall 64 defines an interior opening or chamber 74. A noise making element 70, such as a traditional squeaker, is mounted within the chamber 74, and is supported therein by an interior tubular extension 68. In one aspect of the invention, the interior tubular extension 68 may be a single, molded piece, and made of a selected flexible and elastomeric material, such as a selected rubber or thermoplastic. The noisemaking element 70 is frictionally mounted within the tubular extension 68 such that the exposed end of the element 70 resides within the chamber 74 and spaced from the opposing sidewall 64. A plug or sealing material 66 can be used to seal the element 70 within the chamber 74.

A compression force $F_1$ applied to the bladder 52, such as when the pet toy is squeezed at a location on the torso section 13 where the bladder 52 resides, results in deformation of the sidewall 64, and evacuation of an amount of air from within the chamber 74. That is, when the bladder stretches, the opposing sidewalls 64 are drawn toward one another causing air within the chamber 74 of the bladder to move and be evacuated through the noisemaking element 70 and vent hole 60. As air passes through the orifice or opening 72 in the noisemaking element 70, sound is produced. When the bladder 52 re-inflates, air passes through the noisemaking element in a reverse direction, thereby causing the element to produce a second different sound.

Also in accordance with the invention, when a tension or stretching force $F_2$ is applied to the elastic face 50, this also result in deformation of the bladder 52, which in turn causes an amount of air to evacuate the chamber 74, thereby also producing a sound by the flow of air through the noise making element 70. It is apparent that deformation of the bladder 52 can be achieved not only by compression, but also by tension and therefore, activation of the noise making element to produce sound can occur by either type of force, or combinations thereof.

According to a method of the invention, activation of the noisemaking device can be achieved by at least one force selected from a plurality of forces. These forces include a compression force applied to the noisemaking device, a tension or stretching force applied to the noisemaking device, or combinations thereof. More specifically, the bladder 50 that houses the noisemaking element 52, when deflected or deformed, causes a flow of air to pass through the noisemaking element to produce sound.

According to another embodiment of the invention, more than one elastic base and corresponding noise making device can be incorporated within the fabric body of the pet toy. For example, another elastic base and elongated bladder pair (not shown) could be placed within the fabric body to extend between opposing arms 14 and hands 18. This additional elastic base and elongated bladder pair would therefore extend substantially perpendicular to the other elastic base 50 and elongated bladder 52 pair. Other elastic base and elongated bladder pairs could be placed within the body of the pet toy, depending upon the particular shape of the pet toy, and the manner in which it was desired to provide activation of the noisemaking device at selected locations within the body of the pet toy. Further, the particular size of an elastic base and elongated bladder pair can be selected to fit within corresponding selected areas of the pet toy body, and also selected in size and shape to produce different sounds caused by different volumes of air flowing through the respective noise-making elements.

Based upon the foregoing description, it is apparent that the pet toy and method of the invention allows selective and controlled activation and deactivation of a noise making device of a pet toy in which a force applied to the pet toy to activate the noise making device does not have to be directly applied to the noise making device. As described, a stretching or tension force applied to the pet toy activates the noisemaking device. Particularly for a tug-of-war game between a pet owner and animal, this type of selective activation of the noisemaking device may enhance animal interaction with the pet toy, as well is to provide amusement for the pet owner.

As also should be apparent from the description of the preferred embodiment, a tension force applied to two general opposite sides or ends of the pet toy will enable activation of the noisemaking device and therefore, no precise tension force is required to activate the noisemaking device. The shape of the pet toy including the depicted arms, legs, head, and tail provide different grasping points at opposite ends of the pet toy so a tension force can be easily applied to the pet toy to produce sound.

The invention has been described with respect to one or more preferred embodiments. It shall be understood however that the invention is not specifically limited to these described embodiments, and the invention should therefore be considered in connection with the scope of the claims appended hereto.

What is claimed is:
1. A pet toy comprising:
 a flexible body having an interior defining an open space therein;

an elastic base extending along a portion of said flexible body;

an elastomeric bladder secured to said elastic base, said elastomeric bladder defining a chamber therein, and at least one opening formed in said elastomeric bladder enabling air to flow through said bladder;

a noisemaking element disposed within said elastomeric bladder; and wherein a force applied to said flexible body to deform said bladder enables air to flow through said bladder, thereby activating said noisemaking element to produce a sound.

2. A pet toy, as claimed in claim 1, wherein:
said elastomeric bladder has an elongated shape defined by a dome, a first extension extending from one side of said dome, and a second extension extending from an opposite side of said dome, and said chamber extending within said dome and selected portions of said first and second extensions.

3. A pet toy, as claimed in claim 1, wherein:
said flexible body has a shape resembling a selected animal.

4. A pet toy, as claimed in claim 1, wherein:
said flexible body includes a central torso section, and said elastic base and elastomeric bladder being disposed in said central torso section.

5. A pet toy, as claimed in claim 1, wherein:
said flexible body includes a first appendage located adjacent a first end of said flexible body, and a second appendage located adjacent a second opposite end of said flexible body.

6. A pet toy, as claimed in claim 5, wherein:
said first and second appendages include at least one of an arm and a leg.

7. A pet toy, as claimed in claim 3, wherein:
said flexible body includes features resembling features of the selected animal, said features including at least one of an arm, a leg, a finger, a toe, a head, a mouth, a nose, an eye, hair, an ear, and a tail.

8. A pet toy, as claimed in claim 1, wherein:
said elastic base includes a length of elastic fabric webbing.

9. A pet toy, as claimed in claim 1, wherein:
said elastomeric bladder includes an interior tubular extension for mounting of said noise making element within said chamber of said bladder.

10. A pet toy, as claimed in claim 1, wherein:
said elastomeric bladder has an elongated shape that extends along a longitudinal axis.

11. A method of activating a noise making device of a pet toy, said method comprising:

providing a pet toy including: (i) a flexible body having an interior defining an open space therein; (ii) an elastic base extending along a portion of said flexible body; (iii) an elastomeric bladder secured to said elastic base, said elastomeric bladder defining a chamber therein, and at least one opening formed in said elastomeric bladder enabling air to flow through said bladder; (iv) a noisemaking element disposed within said elastomeric bladder;

applying a force to said flexible body to deform said bladder;

causing air to flow through said bladder and thereby activating said noise making element to produce a sound.

12. A method, as claimed in claim 11, wherein:
said step of applying force includes applying force by at least one of a compression force and a tension force.

13. A method, as claimed in claim 12, wherein said step of applying force includes applying a tension force:
said tension force is applied by securing substantially opposite ends of said pet toy and pulling the ends away from one another.

14. A pet toy comprising:
a body having an interior defining an open space therein;
a base extending along a portion of said body;
a bladder secured to said base, said bladder defining a flexible chamber therein, and at least one opening formed in said bladder enabling air to flow through said bladder;
a noisemaking element disposed within said bladder; and
wherein a force applied to said body to deform said bladder enables air to flow through said bladder, thereby activating said noisemaking element to produce a sound.

15. A pet toy, as claimed in claim 14, wherein:
said bladder has an elongated shape defined by a dome, a first extension extending from one side of said dome, and a second extension extending from an opposite side of said dome, and said chamber extending within said dome and selected portions of said first and second extensions.

16. A pet toy, as claimed in claim 15, wherein:
said base includes a length of an elastic piece of material.

17. A pet toy, as claimed in claim 15, wherein:
said bladder has an elongated shape that extends along a longitudinal axis.

18. A pet toy, as claimed in claim 15, wherein:
a tension force applied to said body causes said base and said bladder to stretch thereby changing a shape of the chamber of said bladder, and causing air to flow through a vent in said bladder.

* * * * *